United States Patent [19]

Okada et al.

[11] Patent Number: 4,943,496
[45] Date of Patent: Jul. 24, 1990

[54] FUEL CELL, ELECTRODE FOR THE CELL AND METHOD OF PREPARATION THEREOF

[75] Inventors: Hideo Okada; Toshikatsu Mori; Kouichi Mitsugi; Yoshio Iwase; Satoshi Kuroe, all of Hitachi; Masato Takeuchi, Katsuta; Tomoichi Kamo, Ibaraki, all of Japan

[73] Assignee: Hitachi, Ltd., Tokyo, Japan

[21] Appl. No.: 301,902

[22] Filed: Jan. 25, 1989

[30] Foreign Application Priority Data

Jan. 25, 1988 [JP] Japan .................................. 63-12539

[51] Int. Cl.$^5$ ............................................. H01M 4/90
[52] U.S. Cl. ....................................... 429/45; 427/115
[58] Field of Search ...................... 429/16, 45; 427/115

[56] References Cited

U.S. PATENT DOCUMENTS 4,567,651  2/1986  Karas et al. ........................... 429/45

OTHER PUBLICATIONS

Chemical Abstracts, vol. 106, No. 20, May 1987, pp. 191-192, Abstract No. 159542g, "Performance of Molten Carbonate Fuel Cells with Low Pressure III, Stability of Anode Microlayers".
EP-A-0,063,807 Energy Research Corp., p. 6, line 22-p. 7, line 29, 1982.

Primary Examiner—Donald L. Walton
Attorney, Agent, or Firm—Antonelli, Terry, Stout & Kraus

[57] ABSTRACT

The present invention provides a molten carbonate type fuel cell comprising two electrodes as anode and cathode, an electrolyte plate and separators in a single unit and a battery of the unit cells stacked. The electrodes comprise a porous plate of an electron-conducting material such as nickel containing particles of ceramics such as magnesium oxide uniformly dispersed therein in an amount of 2 to 29 atomic %, except for the superficial thin portion free of the ceramic particles on the one-side surface of the plate. The electrodes are prepared by mixing a powder of the electro-conducting material with an organic binder under stirring to obtain a slurry or paste, deaerating the slurry or paste to remove entrained air bubbles therefrom, shaping the slurry or paste plate with or without a metal wire net, drying the electrode plate at room temperature and finally firing the plate in a reducing atmosphere.

6 Claims, 3 Drawing Sheets

FUEL CELL, ELECTRODE FOR THE CELL AND METHOD OF PREPARATION THEREOF

BACKGROUND OF THE INVENTION

1. FIELD OF THE INVENTION

The present invention relates to a molten carbonate type fuel cell or battery, more particularly it relates to an electrode for use in the molten carbonate type fuel cell or battery and a method of preparing the electrode. This electrode is prevented from being plastically deformed and improved in reducing contact resistance between the electrodes and an electrolyte plate.

2. RELATED ART

Generally, the molten carbonate type fuel cell comprises a single unit cell comprising two electrodes as anode 1 and cathode 2, an electrolyte plate 3 and separators 4, as shown in FIG. 1. Furthermore, collectors may be provided between the separators and the anode and/or cathode. A plurality of the single unit cells are stacked to form a battery. In this fuel cell, an alkali metal carbonate such as lithium carbonate and potassium carbonate is used as an electrolyte, a fuel gas containing hydrogen is allowed to pass through the channels of the separator facing the anode and, on the other hand, a mixed gas of air and oxygen or carbon monoxide as an oxidizing agent is allowed to pass through the channels facing the cathode. This cell is operated at an elevated temperature of, for example, about 650° C.

The cathode and anode both are made of an electron-conductive and porous material such as sponge nickel. The electrolyte is contained in an electrolyte plate, i.e., the plate comprises a matrix of a compacted powdery material such as $LiAlO_2$ impregnated with a molten carbonate such as potassium carbonate ($K_2CO_3$) and lithium carbonate ($Li_2CO_3$). The separator is in general made of stainless steel such as SUS 310 or ceramics.

Heretofore there have been proposed various electrodes for such fuel cells, for example, made of a nickel powder-deposited nickel or stainless steel wire net [see Japanese Patent KOKAI (Laid-Open) Nos. 57-34668, 52-136336 and 57-40866].

These prior art electrodes may be plastically deformed with the lapse of time during operation of the cell, or sintered when used in a short time to reduce the specific surface area of a porous electrode, so that the performance of the cell is deteriorated.

In order to overcome such problems as mentioned above, there have been proposed various methods: one in which a nickel oxide powder and a metal oxide powder are mixed, pulverized and pelletized, and the resulting pellets are subjected to the reducing treatment to selectively reduce the nickel and the selectively reduced powder is used as an electrode material, and another one in which a metal element is coated on a ceramic carrier to form an electrode [see U.S. Pat. No. 4,247,604 and Japanese Patent KOKAI (Laid-Open) Nos. 61-271749, 62-2455, 61-267267, 62-5566, 60-253162, 62-76159 and 61-22569].

However, electrodes using these oxide-mixed metal powder, i.e., comprising different layers, a metal layer and an oxide layer inconveniently have cracks generated therein during the process of preparing the electrodes in which the electrodes are repeatedly heated for oxidation and reduction. Furthermore, warp or wave is generated in the electrodes, because the different layers are different in coefficient of thermal expansion from each other. Therefore, the prior art electrodes have such problems that contact resistance between the electrodes and the collectors and/or electrolyte plate is increased. Thus, there have been difficulties in obtaining molten carbonate type fuel cells having a stabilized cell performance.

Moreover, cells using the prior art electrodes have been intended to have a current density of at most 200 mA/cm². For example, the electrode according to an embodiment of Japanese Patent KOKAI (Laid-Open) No. 61-22569 referred to above is made by filling a foamed nickel plate as an anode at one side thereof with a paste comprising a mixture of carbonyl nickel and chromium in an ethanol solution of polyvinyl butyral and drying the plate. The paste-filled side faces the electrolyte plate when assembled in a cell. The electrode is not filled at the opposite side with the paste for maintaining the good diffusion of gases. From the cell using the electrode according to Japanese Patent KOKAI (Laid-Open) No. 61-22569 can be taken a current density of at most 200 mA/cm².

On the other hand, there has been a demand to obtain a molten carbonate type fuel cell from which so high a current density as about 300 mA/cm² can be taken without increasing an amount of internal resistance.

SUMMARY OF THE INVENTION

One object of the present invention is to provide an electrode prevented from being plastically deformed and improved in reducing contact resistance between the electrode and an electrolyte plate, i.e., having no cracks, warp and wave generated therein.

Another object of the present invention is to provide a molten carbonate type fuel cell or battery using the electrodes as anode and cathode, which can have a long durability, i.e., maintain a good cell performance over a long period of time and give a high current density of nearly 300 mA/cm².

A further object of the present invention is to provide a battery comprising a plurality of the above-mentioned cells stacked.

Still further object of the present invention is to provide a method of preparing the above-mentioned electrode.

In accordance with the present invention, there is provided an electrode as anode or cathode for a molten carbonate type fuel cell by making a porous plate of an electron-conducting material through a usual process, applying a water-repellent onto the surface of the porous plate allowed to face the fuel or oxidizing gas-passing side, of a separator, impregnating the plate with a dispersion or solution of a ceramic source, prefiring the plate in an oxidizing atmosphere and finally firing the plate in a reducing atmosphere.

Fuel cells using the electrode of the present invention have less changed internal resistance and less amount of contact resistance, and thus they exhibit a stabilized cell performance over a long period of time.

DETAILED DESCRIPTION OF THE PREFERRED EMBODIMENTS

The problems of the prior art molten carbonate type fuel cells can be overcome by providing an electrode as anode or cathode comprising a porous electron-conducting body containing ceramic particles uniformly dispersed therein but having a superficial thin portion free of the ceramic particles at the fuel or oxidizing gas-passing side of the body. This electrode is made by making a porous plate of an electron-conducting material through a usual process, applying a water-repellent onto the surface of the porous plate allowed to face the fuel or oxidizing gas-passing side of a separator, impregnating the plate with a dispersion of a ceramic source, prefiring the plate in an oxidizing atmosphere and finally firing the plate in a reducing atmosphere.

Figure 1:
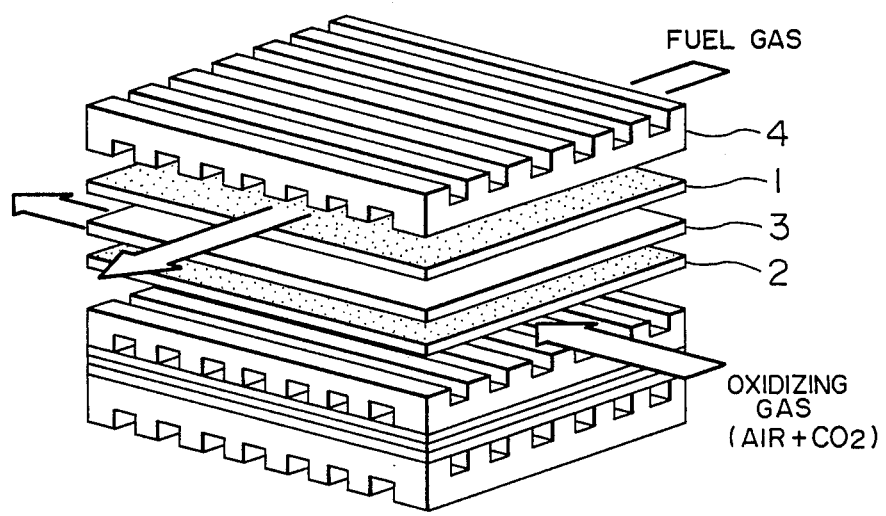
FIG. 1 is a schematical diagram of an embodiment of the cells of the present invention.
Figure 2:
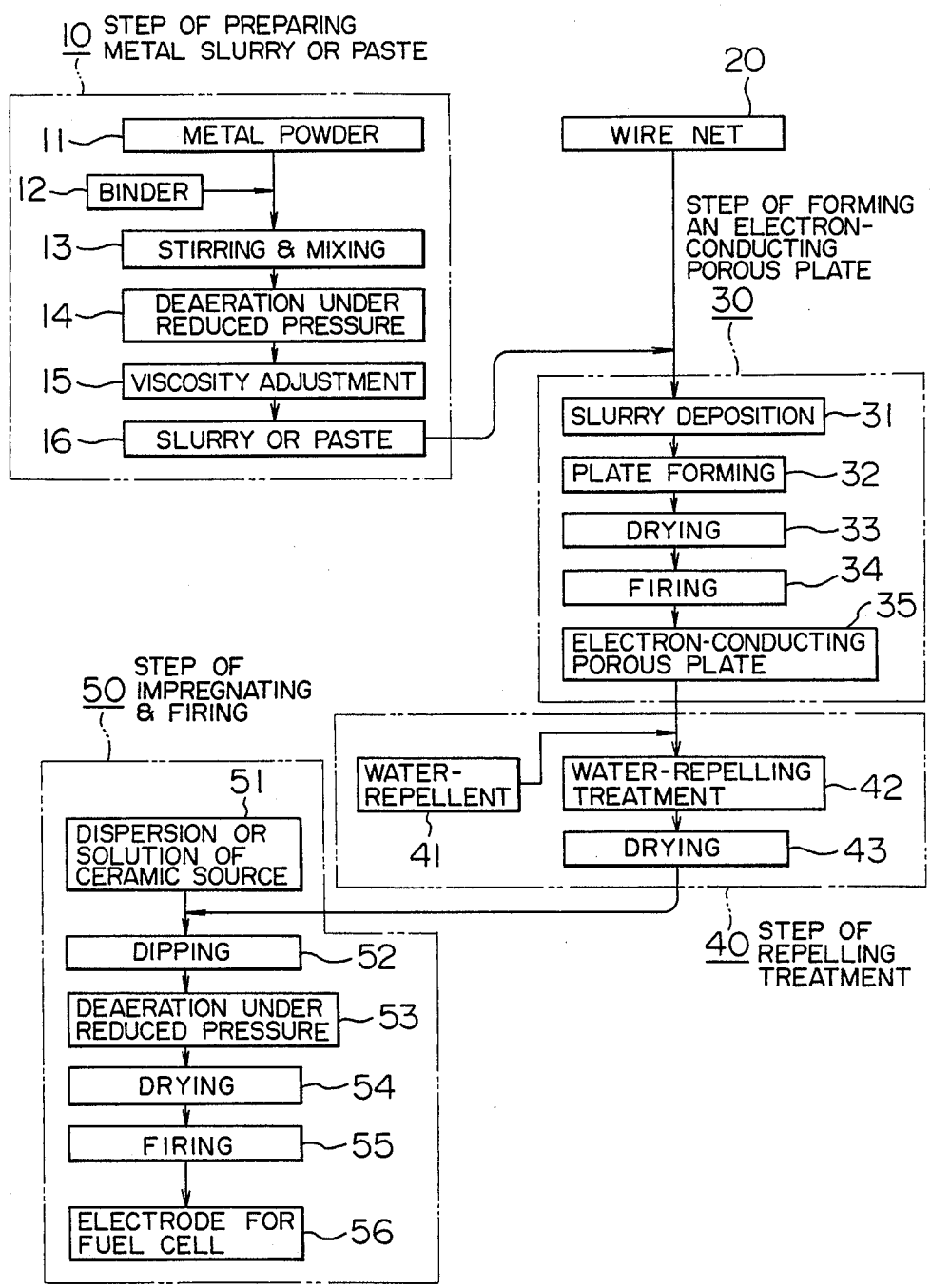
FIG. 2 is a flow chart of process for preparing the electrode of the present invention.

The porous plate of an electron-conducting material is made by a usual process under "step of preparing a metal slurry or paste' 10 as defined in FIG. 2. That is, a metal powder as a starting material is mixed with an organic binder 12 under stirring 13 for viscosity adjustment to obtain a slurry or paste, which is then deaerated under vacuum 14 to remove entrained air bubbles from the slurry or paste, thus obtaining a predetermined slurry or paste 16.

The metal powder is comprised of at least one metal selected from nickel, cobalt, copper, chromium and iron, mixtures or alloys thereof, and it is of 0.1 to 10 $\mu$m, preferably 1 to 5 $\mu$m in particle size. To the metal powder is added an organic binder and water, the mixture is kneaded to form a slurry or paste, which is deaerated to adjust the viscosity to 50 to 200 poises, preferably 100 to 200 poises. The organic binder used herein may be, for example, carboxymethyl cellulose (CMC), hydroxyethyl cellulose (HEC), polyethylene oxide (PEO), polyvinyl alcohol (PVA) or polyvinyl butyral (PVB).

If the particle size of the metal powder is smaller than 0.1 $\mu$m, the sintering action is accelerated in the subsequent step of firing in a reducing atmosphere as mentioned below, so that the specific surface area of the electrode is conspicuously reduced, which causes cracks to be generated in the electrode. If the particle size exceeds 10 $\mu$m, on the other hand, no specific surface area sufficient to the electrode reactions is obtained, so that the cell performance is lowered.

The viscosity of less than 50 poises is too lower to shape an electrode plate on a wire net. If the viscosity exceeds 200 poises, it is too hard to form the surface of electrode.

The thus obtained slurry or paste is either deposited on a wire net or shaped in a plate, by, for example, a doctor blade without any such wire net, or molding under "step of forming an electron-conducting porous plate' 30 as defined in FIG. 2. For example, the slurry or paste 16 is deposited on the wire net 20 of a metal such as nickel to form a plate 32 of 0.5 to 2 mm in thickness, dried 33 at room temperature and fired 34 in a hydrogen atmosphere at a temperature of 700° to 1000° C. for 0.5 to 5 hours to form the electron-conducting porous plate 35 of 3 to 10 $\mu$m in average pore size.

If the average pore size is smaller than 3 $\mu$m, the fuel and oxidizing reaction gases do not only become poorer in the gas-diffusing property but also the plate becomes easier to absorb an electrolyte from the electrolyte plate, so that the electrode reaction areas are reduced. If the average pore size exceeds 10 $\mu$m, on the other hand, the specific surface area per unit area of the electrode plate becomes so small that the cell performance is poor, and the strength of the electrode plate is lowered and creep resistance also lowered.

A water-repellent 41 is applied or coated 40 onto one side of the electron-conducting porous plate 35 in water-repelling treatment 42. The water-repellent used in the present invention is a material having a contact angle to water at a normal temperature of 20° to 25° C. of 87° or higher. For example, it may be a polymer such as polyvinyl chloride, polyethylene, polystyrene, polypropylene, polyfluoroethylene, polytetrafluoroethylene and etc., a wax, fat or oil such as paraffin, silicone oil, polydimethyl siloxane, polyalkyl siloxane and dimethyl silicone oil, a grease-like oil containing the above-mentioned wax, fat or oil, or fluorinated carbon. The applied repellent is dried in air 43. For example, when polytetrafluoroethylene is used as the water-repellent 41, it is heated to the melting point of the polytetrafluoroethylene, i.e., about 320° C. to form a film 42 of the water-repellent on the porous plate.

Figure 3A:
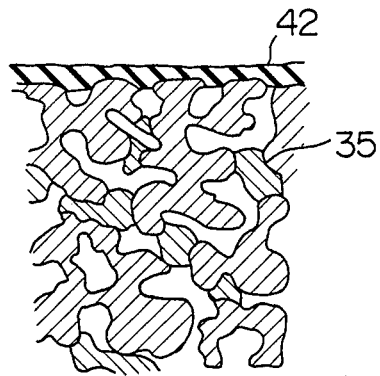
FIG. 3a, 3b and 3c are diagrammatical views of the cross-sections of a porous plate having a water-repellent applied thereon, dipped in a dispersion of a ceramic source and finally fired, respectively.
Figure 3B:
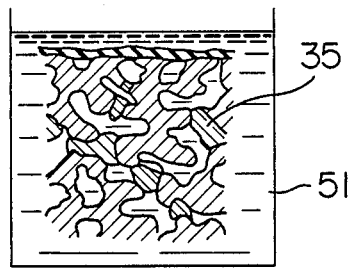

FIG. 3$a$ is an enlarged diagrammatical cross-sectional view of the thus obtained porous plate 35 having the film 42 of water-repellent applied thereon.

Subsequently, the objective electrode is made under "step of impregnating and firing' 50 as defined in FIG. 2. The water-repellent-applied porous plate is dipped 52 in a dispersion or solution 51 of a ceramics-affording source placed in a sealed container, as shown in FIG. 3$b$, which is an enlarged diagrammatical cross-sectional view of the dipped porous plate. The sealed container is evacuated 53 with a vacuum pump to deaerate the pores of the plate and impregnate the plate with the dispersion or solution. The ceramics-affording source may be at least one compound of a metal selected from magnesium, zirconium, aluminum, lanthanum, silicon, yttrium and etc., or a mixture thereof. The compound may be an oxide, carbide, nitride, boride or nitrate. This source is dispersed or dissolved in water or an acid solution to form the above-mentioned dispersion or solution. The amount of the ceramic particles 52' in the impregnated plate is preferably in the range of 2 to 20 atomic %.

Thereafter, the plate is sufficiently dried 54 at room temperature and prefired 55 in air at a temperature of 300° to 500° C. for 1 to 10 hours. Then, the prefired plate is finally fired 55 in an atmosphere comprised predominantly of hydrogen at a temperature of 700° to 1000° C. for 0.5 to 5 hours. Thus, the electrode 56 for the molten carbonate type fuel cell can be obtained, which electrode contains ceramic particles uniformly dispersed therein but having a superficial thin portion free of ceramic particles. This cell is assembled so that the ceramic particles-free surface of the electrode is allowed to face the current collector or separator and the ceramic particles-dispersed side of the electrode is allowed to face the electrolyte plate.

Firing 55 is divided into two steps of prefiring in an oxidizing atmosphere at a temperature of 300° to 500° C. for 1 to 10 hours and final firing in a reducing atmosphere containing hydrogen gas or carbon monoxide gas at a temperature of 700° to 1000° C. for 0.5 to 5 hours. For example, the reducing atmosphere may be comprised of a mixed gas of 20 to 100 vol % of hydrogen gas and the balance of nitrogen gas.

The prefiring serves to give oxide ceramic particles due to the thermal decomposition of a metal salt such as a nitrate or organic salt of a metal such as magnesium, zirconium, aluminum, lanthanum, silicon, yttrium and the like. If the prefiring temperature is lower than 300°

C., then the thermal decomposition is insufficient, and if the prefiring temperature exceeds 500° C., then the metal of the porous plate such as nickel is conspicuously oxidized so that the performance of the electrode is deteriorated. On the other hand, if the prefiring time is shorter than 1 hour, then the metal salt is not fully decomposed, and if the time exceeds 10 hours, then the metal of the porous plate is unfavorably overly oxidized.

The final firing is carried out in a reducing atmosphere for the purpose of sintering the electrode. The reducing atmosphere comprises 20 to 100 vol % of hydrogen gas and 80 to 20 vol % of an inert gas such as nitrogen gas. The hydrogen gas may be replaced with carbon monoxide gas. The sintering temperature is in the range of 700° to 1000° C. If the sintering temperature is lower than 700° C., then no strength of electrode required can be obtained, and if it exceeds 1000° C., then the electrode is overly sintered so that the performance of the electrode is deteriorated. Furthermore, the sintering time is in the range of 0.5 to 5 hours. If the time is shorter than 0.5 hour, then no sufficient sintering is achieved, and the time exceeding 5 hours is too redundant to improve the performance of the electrode or cell.

Figure 3C:
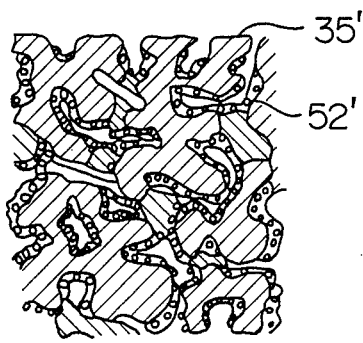

FIG. 3c diagrammatically shows that the electrode plate has an electron-conducting thin portion or layer 35' free of ceramic particles. The thickness of the thin portion or layer 35' is in the range of about 0.001 to 0.1 mm. This thickness varies depending upon the particle size of the metal powder as mentioned above and the ways of repelling treatment. However, the maximum thickness of 0.1 mm is required to diminish the degree of plastic deformation (creep) and sintering. On the other hand, the minimum thickness of about 0.01 mm is possible to obtain with the particle size of the metal powder and the ways of repelling treatment.

According to the present invention, such inclusions as ceramic particles are easily prevented from being at the contact between the electrodes and the current collector (separator), so that the increase of contact resistance may be inhibited. Furthermore, since the electrode of the present invention is prevented from being plastically deformed and from being sintered by impregnating it with the dispersion or solution of ceramic source and easily wettable with the electrolyte, the cell using this electrode can have a good cell performance maintained for a long period of time.

Moreover, the electrode of the present invention has an electron-conducting thin portion free of the ceramic particles, which portion faces the current collector or separator. Therefore, the contact resistance between the electrode and the current collector or separator is greatly decreased. In other words, the internal resistance of the molten carbonate type fuel cell is not increased.

The present invention will be illustrated below with reference to some examples and comparative example.

EXAMPLE 1

1 kg of a nickel powder of 3 to 4 $\mu$m in particle size was intimately mixed with 1.2 liters of a 1.0% carboxymethyl cellulose (CMC) solution in a stirring mixer, and the mixture was deaerated by a vacuum pump to adjust the viscosity of the mixture to about 150 poises. This mixture was deposited on a 40 mesh nickel wire net to form a plate of about 1.4 mm in thickness. The plate was air dried and then fired in an atmosphere of 70% $H_2$-30% $N_2$ gas (by volume) at 700° C. for about 2 hours. The thus obtained plate was electron-conductive and porous, and it has a thickness of 0.75 mm, porosity of 68.5% by volume and average pore size of 6.8 $\mu$m. The electron-conducting porous plate was coated on one side surface thereof with wax, and then dried at 70° C. for about 1 hour.

The porous plate was dipped in an aqueous solution containing 0.51 kg of lanthanum nitrate ($La(NO_3)_3 \cdot 6 H_2O$) dissolved in 1 liter of water. The plate in the solution was placed in a vacuum container for about 5 minutes, removed from the container and air dried for about 12 hours. Then, the plate was prefired at 450° C. for 2 hours.

Subsequently, the plate was fired in an atmosphere of a mixed gas of 70% $H_2$—30% $N_2$ at 750° C. for 1 hour to prepare an electrode for molten carbonate type fuel cell having an electron-conducting thin portion of 0.07 mm in thickness and free of ceramic particles and a major portion containing ceramic particles uniformly dispersed therein.

EXAMPLE 2

An electron-conducting porous plate was prepared in the same manner as in Example 1. This plate was spray coated on one side surface thereof with a dispersion of a polytetrafluoroethylene resin while being heated to about 100° C., and further heated to 320° C. Thus, the repelling treatment was made. The plate was dipped in an aqueous solution of lanthanum nitrate, then evacuated by a vacuum pump, and dried and fired in the same manner as in Example 1 to prepare an electrode for molten carbonate type fuel cell having an electron-conducting thin portion of 0.03 mm in thickness and free of ceramic particles and a major portion containing ceramic particles uniformly dispersed.

EXAMPLE 3

An electron-conducting porous plate prepared in the same manner as in Example 1 was coated on one side surface thereof with grease, and then dipped in an aqueous solution of lanthanum nitrate, deaerated with a vacuum pump, dried and fired in the same manner as Example 1 to make an electrode for a molten carbonate type fuel cell having an electron-conducting thin portion of 0.09 mm in thickness and free of ceramic particles.

COMPARATIVE EXAMPLE 1

An electron-conducting porous plate prepared in the same manner as in Example 1 was dipped in an aqueous solution of lanthanum nitrate without applying to it any water-repellent, deaerated by a vacuum pump, dried and fired in the same manner as in Example 1 to prepare an electrode containing ceramic particles uniformly dispersed therethrough.

EXAMPLE 4

A molten carbonate type unit cell was assembled using each of the electrodes of Examples 1 to 3 and Comparative Example 1 as an anode In this cell, a cathode was made of nickel oxide, electrolyte plate was a matrix-type electrolyte plate of 2 mm thick. Some of each unit cell were stacked and checked up on the internal resistance of the cell. The internal resistance was determined at 650° C. in the four-terminal method by measuring the voltage (V) when an alternate current (i) of 1000 Hz was applied to the cell and then calculating the internal resistance (R) in accordance with the equation of $R=V/i$. The device used for the measurement was Milliohmmeter 432A made by Hewlett Packard Corporation. The results are reported in Table 1. As is clear from the table, the internal resistance of the cells according to the present invention is about ½ or less smaller than that of the comparative example.

TABLE 1

| | Water-repellent | Internal Resistance of Cell ($\Omega \cdot cm^2$) |
|---|---|---|
| Example 1 | Wax | 1.1 |
| Example 2 | Polytetrafluoroethylene | 0.9 |
| Example 3 | Grease | 1.0 |
| Comparative Example 1 | not applied | 2.3 |

EXAMPLE 5

The unit cell made in Example 4 was heated to and then the electric generation test with the cell was conducted by supplying a mix gas of 80% $H_2$—20% $CO_2$ to the anode and a mix gas of 15% $O_2$—30% $CO_2$—55% $N_2$ to the cathode. The results are shown in Table 2. The cell with an anode having the portion free of any ceramic particles according to the present invention clearly has a higher cell voltage than that of Comparative Example 1 at a high load current density.

TABLE 2

| | Water-repellent | Cell Voltage (current density: 300 mA/cm$^2$) |
|---|---|---|
| Example 1 | Wax | 0.60 |
| Example 2 | Polytetrafluoroethylene | 0.65 |
| Example 3 | Grease | 0.62 |
| Comparative Example 1 | not applied | 0.35 |

What is claimed is:

1. A molten carbonate type fuel cell which comprises two electrodes, an electrolytic plate and two separators having gas-passing channels in a single unit, each of said two electrodes comprising a porous plate of an electron conductive material containing ceramic particles uniformly dispersed therein except for a superficial thin portion having a thickness of 0.001 to 0.1 mm free of the ceramic particles on a surface of the plate facing one of said two separators, wherein said electron conductive material is comprised of at least one metal selected from nickel, cobalt, copper, chromium and iron, and mixtures and alloys thereof, and wherein said ceramic particles are formed from a ceramics-affording source which is at least one compound of a metal selected from magnesium, zirconium, aluminum, lanthanum, silicon and yttrium, and mixtures thereof.

2. The molten carbonate type fuel cell according to claim 1, wherein each of said two electrodes is prepared by making a porous plate of an electron-conducting material, applying a water-repellent onto the surface of said porous plate facing one of said two separators, impregnating the porous plate with a dispersion or solution of a ceramics-affording source, prefiring the plate in an oxidizing atmosphere and finally firing the plate in a reducing atmosphere.

3. The molten carbonate type fuel cell according to claim 2, wherein said compound is an oxide, carbide, nitride, boride or nitrate.

4. The molten carbonate type fuel cell according to claim 2, wherein the amount of the ceramic particles in the impregnated plate is in the range of 2 to 20 atomic %.

5. A molten carbonate type fuel battery which comprises a plurality of the stacked single unit cells claimed in claim 1.

6. A molten carbonate type fuel battery which comprises a plurality of the stacked single unit cells claimed in claim 2.

* * * * *